(12) United States Patent
Bell et al.

(10) Patent No.: US 6,253,888 B1
(45) Date of Patent: Jul. 3, 2001

(54) SHOCK ABSORBER WITH ACCELERATION SENSITIVE DAMPING CONTROL

(75) Inventors: Stephen H. Bell, Guelph (CA); Robert P. Carlstedt, Rochester Hills, MI (US)

(73) Assignee: Gabriel Ride Control Products, Inc., Brentwood, TN (US)

( * ) Notice: Subject to any disclaimer, the term of this patent is extended or adjusted under 35 U.S.C. 154(b) by 0 days.

(21) Appl. No.: 09/244,590

(22) Filed: Feb. 4, 1999

(51) Int. Cl.$^7$ .................................................. F16F 9/34
(52) U.S. Cl. ...................... 188/275; 188/314; 188/322.15
(58) Field of Search ............................. 188/275, 282.1, 188/282.8, 322.15, 314, 315

(56) References Cited

U.S. PATENT DOCUMENTS

| | | | | |
|---|---|---|---|---|
| 3,338,347 | * | 8/1967 | Avner | 188/275 |
| 4,084,667 | * | 4/1978 | Kurrat | 188/275 |
| 4,850,461 | * | 7/1989 | Rubel | 188/282.1 |
| 5,070,470 | * | 12/1991 | Johnston et al. | 188/315 |
| 5,248,014 | * | 9/1993 | Ashiba | 188/322.15 |
| 5,618,248 | * | 4/1997 | Huang | 188/315 |
| 5,833,036 | * | 11/1998 | Gillespie | 188/315 |

* cited by examiner

Primary Examiner—Matthew C. Graham
(74) Attorney, Agent, or Firm—McAndrews, Held & Malloy, Ltd.

(57) ABSTRACT

The present invention provides an improved method and apparatus for controlling damping in a shock absorber based on the relative acceleration between the shock main body and the piston rod extended from the shock main body. The shock absorber has a reservoir compartment and a fluid-filled internal chamber divided into a compression compartment and a rebound compartment by a movable piston. A piston rod is connected to the piston and extends through a seal in the rebound end of the internal chamber. The shock absorber contains flow passages connecting, and normally allowing fluid to flow between, the reservoir compartment, the compression compartment and the rebound compartment. Fluid flow in the flow passages, which is directly related to the relative motion between the shock main body and the piston rod assembly, is allowed or inhibited based on the relative acceleration between shock absorber components. Control of the flow of fluid through the flow passages, which in turn inhibits or allows relative motion between the shock main body and the piston rod assembly, is accomplished through the use of mechanisms sensitive to passive differential accelerational forces acting on various components of the shock absorber.

9 Claims, 5 Drawing Sheets

SHOCK ABSORBER WITH ACCELERATION SENSITIVE DAMPING CONTROL

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

1. Field of the Invention

The present invention relates to hydraulic shock absorbers. More specifically, the present invention relates to a method and apparatus for increasing the performance of hydraulic shock absorbers by providing acceleration sensitive damping through the regulation of fluid flow within the shock absorber.

2. Description of the Related Art

Shock absorbers are commonly used in vehicle suspension systems to absorb unwanted vibrations which occur during driving. Specifically, shock absorbers are generally connected between the body (sprung mass) and the suspension (unsprung mass) of the vehicle to "dampen" vibrations transmitted from the suspension to the body.

Vehicle shock absorbers usually have a hollow cylinder defining an internal chamber, which is divided into a compression compartment and a rebound compartment by a piston assembly slidably positioned in the internal chamber. The shock absorber includes internal valving which permits fluid to flow between the compression and rebound compartments as the piston moves within the internal chamber. One end of the cylinder is closed and is typically connected to the vehicle suspension by a suitable linkage. A piston rod extends through a seal assembly mounted in the other end of the cylinder and has its inner end connected to the piston and its outer end connected to the vehicle body by a suitable connector.

The piston assembly limits the flow of damping fluid within the internal chamber of the shock absorber during compression and extension of the shock, thereby providing a damping force which "smooths" or "dampens" vibrations transmitted from the suspension to the body. The damping characteristics of a shock absorber are determined by the fluid pressure differential across the piston required to drive the fluid between the compression, rebound and reservoir compartments. This pressure differential and resulting flow rate, in turn, controls the speed at which the piston may move in the cylinder responsive to the external forces applied to the shock absorber. The greater the degree to which the flow of damping fluid is restricted by the piston assembly, the greater the damping forces which are provided by the shock absorber. Accordingly, a "soft" compression and rebound stroke is produced when the flow of damping fluid in the working internal chamber is relatively unrestricted. By contrast, a "firm" compression and rebound stroke is produced when there is an increased restriction in the flow of damping fluid in the working internal chamber.

Different driving characteristics, such as ride comfort, vehicle handling, and road holding ability depend on the amount of damping force provided by the vehicle's shock absorbers. The amount of damping force required to meet a particular set of driving characteristics is, in turn, dependent on driving surface conditions. There are sudden and short-lived driving conditions which call for increased damping. For example, a pothole results in a rapid rebound stroke followed by a jarring compression stroke. The jarring is in part caused by an unnecessarily large rebound stroke due to the rapid falling of the suspension into the pothole. There exists a need in the art for a shock absorber with damping that adjusts automatically in response to inordinately rapid accelerations of shock absorber components.

SUMMARY OF THE INVENTION

Accordingly, it is an object of the present invention to provide a method and apparatus for providing acceleration sensitive damping.

It is another object of the present invention to provide a method and apparatus for adjusting shock absorption damping based on the acceleration of shock absorber components.

It is further object of the present invention to provide a method and apparatus for providing acceleration sensitive shock absorption damping through the use of acceleration sensitive mechanical members to regulate fluid flow between the internal chambers of a shock absorber.

One or more of the foregoing objects is met in whole or in part by a preferred embodiment of the present invention that provides a method and apparatus for improved shock absorption with acceleration sensitive damping. The shock absorber has a reservoir compartment and a fluid-filled internal chamber divided into a compression compartment and a rebound compartment by a movable piston. A piston rod is connected to the piston and extends through a seal in the rebound end of the internal chamber. The shock absorber contains flow passages connecting and allowing fluid to flow between the reservoir compartment, the compression compartment and the rebound compartment. Fluid flow in the flow passages, which is directly related to the relative motion between the shock main body and the piston rod, is allowed or inhibited based on the acceleration of shock absorber components. An acceleration sensitive mechanism is provided which is slidably mounted near one or more of the flow passages. The mechanism may be sensitive to accelerations of either the shock main body or the piston rod. The mechanism is normally biased to allow fluid flow in the flow passages. When accelerations above design thresholds are experienced, the mechanism moves to inhibit fluid flow in the flow passages, thereby inhibiting the relative motion between the shock body and the piston rod, and thus providing acceleration sensitive damping.

By use of the present invention, shock absorption damping may be adjusted in real-time in response to sudden driving surface anomalies. These and other advantages of the present invention will become apparent to those skilled in the art upon reading and understanding the following detailed description with reference to the accompanying figures.

DETAILED DESCRIPTION OF THE PREFERRED EMBODIMENT

In the following detailed description, spatially orienting terms are used, such as "upper," "lower," "left," "right," "vertical," "horizontal," and the like. It is to be understood that these terms are used for convenience of description of the preferred embodiments by reference to the drawings. These terms do not necessarily describe the absolute location in space, such as left, right, upward, downward, etc., that any part must assume.

Figure 1:
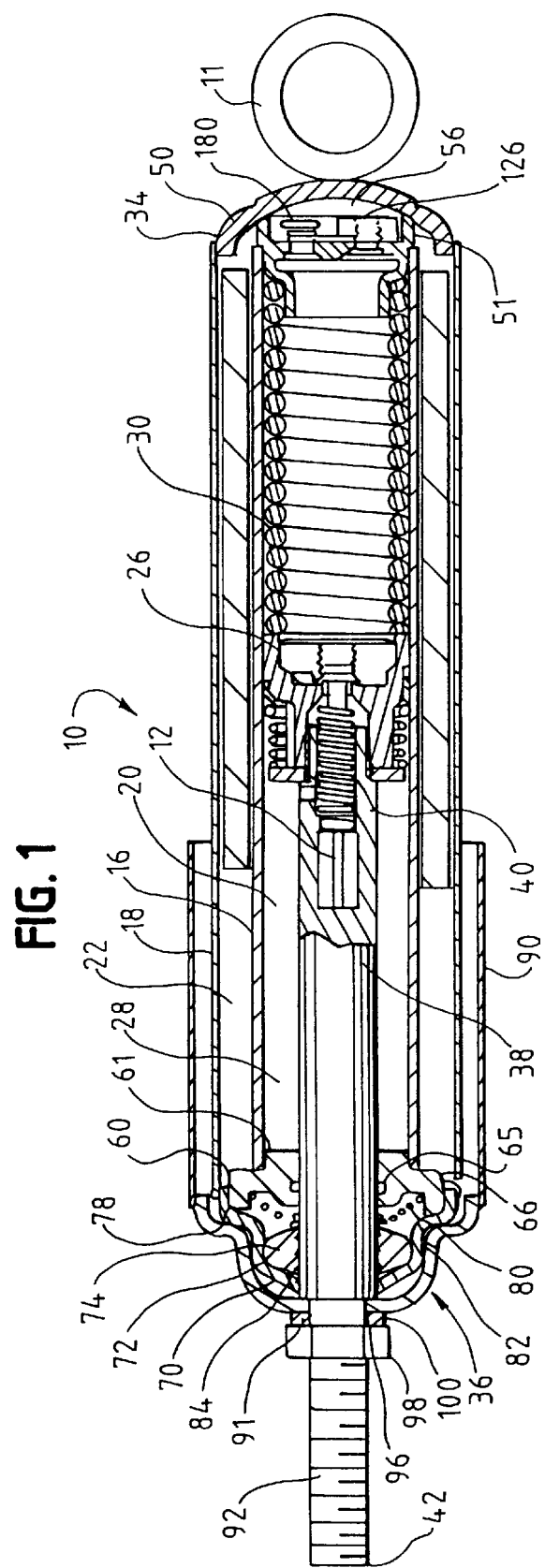
FIG. 1 is a cross-sectional view of a shock absorber with acceleration sensitive damping according to a preferred embodiment of the present invention.

FIG. 1 illustrates a shock absorber 10 incorporating a mechanism 12 for controllably damping the rebound motion of the shock absorber 10. The mechanism 12 is shown in conjunction with a shock absorber 10 similar to those described in U.S. Pat. Nos. 4,310,077 and 5,234,084, the disclosures of which are hereby incorporated by reference.

The shock absorber 10 includes inner and outer cylinders 16, 18 extending coaxially with each other. The inner cylinder 16 defines an internal chamber 20, and the space between the inner and outer cylinders defines a reservoir compartment 22. A piston 26, slidably mounted within the internal chamber 20, divides the chamber 20 into a rebound compartment 28 and a compression compartment 30, the volumes of which vary in accordance with the position of the piston 26.

The ends of the cylinders 16, 18 adjacent the compression compartment 30 are closed by a first closure assembly 34, whereas the ends adjacent the rebound compartment 28 are closed by a second closure assembly 36. A piston rod 38 has an inner end 40 affixed to the piston 26 and an outer end 42 slidably and sealably projecting through the second closure assembly 36. As such, the end of the shock absorber adjacent the rebound compartment 28 is sometimes referred to as the open end or rod end, whereas the end adjacent the compression compartment 30 is commonly referred to as the closed end.

The shock absorber 10 is adapted to be connected between two masses or members. For this purpose, a connector 44, such as an eye connector, is secured to the central exterior of the first closure assembly 34. Similarly, the outer end 42 of the piston rod 38 is threaded to permit it to be secured to a mounting aperture, for example, by a reciprocal nut (not shown). Alternatively, the outer end 42 of the piston rod 38 could include an eye connector similar to the connector 44.

The shock absorber 10 is filled with fluid, such as hydraulic oil, pressurized air and/or a combination of both. As is explained below, the shock absorber 10 includes a fluid control system for permitting controlled fluid flow between the compression and rebound compartments 28, 30 as the piston 26 moves within the internal chamber 20, thereby providing the desired damping force.

The first closure assembly 34 includes an outer closure member 50 which is fixedly connected to the end of the outer cylinder 18 to seal the end of the outer cylinder 18. The first closure assembly 34 further includes a base member 54 which is fixedly connected with the end of the inner cylinder 16 and extends into the interior volume of the outer closure member 50. The periphery of the base member 54 provides passages between the reservoir compartment 22 and the space 56 between the base member 54 and outer closure member 50.

The second closure assembly 36 includes an inner head 60 which closes the other end of the inner cylinder 16. The inner head 60 has a reduced diameter lower portion 64 which is press fit into the inner cylinder 16 and a central aperture sized to slidably engage about the piston rod 38. A seal 65 disposed within the central aperture seals about the outer surface of the piston rod 38. The inner head 60 further includes an increased diameter upper flange 66 which extends radially towards the outer cylinder 18.

The second closure assembly 36 further includes a seal assembly 70 comprising a metallic outer cap 72 and an elastomeric seal member 74, both of which include a respective center aperture sized to slidably engage about the piston rod 38. The outer cap 72 includes a lower leg 78 which is fixedly jointed to the outer cylinder 18 to secure the seal assembly 70 in the rod end of the shock absorber 10. A spring 80 is positioned between the inner head 60 and the seal member 74 to bias the seal member 74 against the inner face of the outer cap 72. A spring seat 82 may be positioned between the spring 80 and the seal member 74 to prevent degradation of the seal member 74 by the spring 80. The center aperture of the seal member 74 includes a plurality of lips or ridges 84 which scrape against the outer diameter of the piston rod 38 to remove excess shock absorber fluid from the rod as it moves out of the internal chamber 20.

The shock absorber 10 is equipped with a dust cover 90 which surrounds the upper portion of the outer cylinder 18. The dust cover 90 is fixedly connected at its upper end to the piston rod 38 for movement therewith. For this purpose, the outer end 42 of the piston rod 38 includes a reduced diameter portion 92 defining a shoulder 94. The dust cover 90 has a center bore 96 sized to fit around the reduced diameter portion 92 of the piston rod 38. The dust cover 90 is secured against the shoulder 94 by a hex nut 98 which threads onto the reduced diameter portion 92 above the dust cover 90. A locking washer 100 can be positioned between the hex nut 98 and the dust cover 90 to prevent the hex nut 98 from being loosened by vibration. Alternately, the dust cover 90 can be welded to the shoulder 94.

Figure 2:
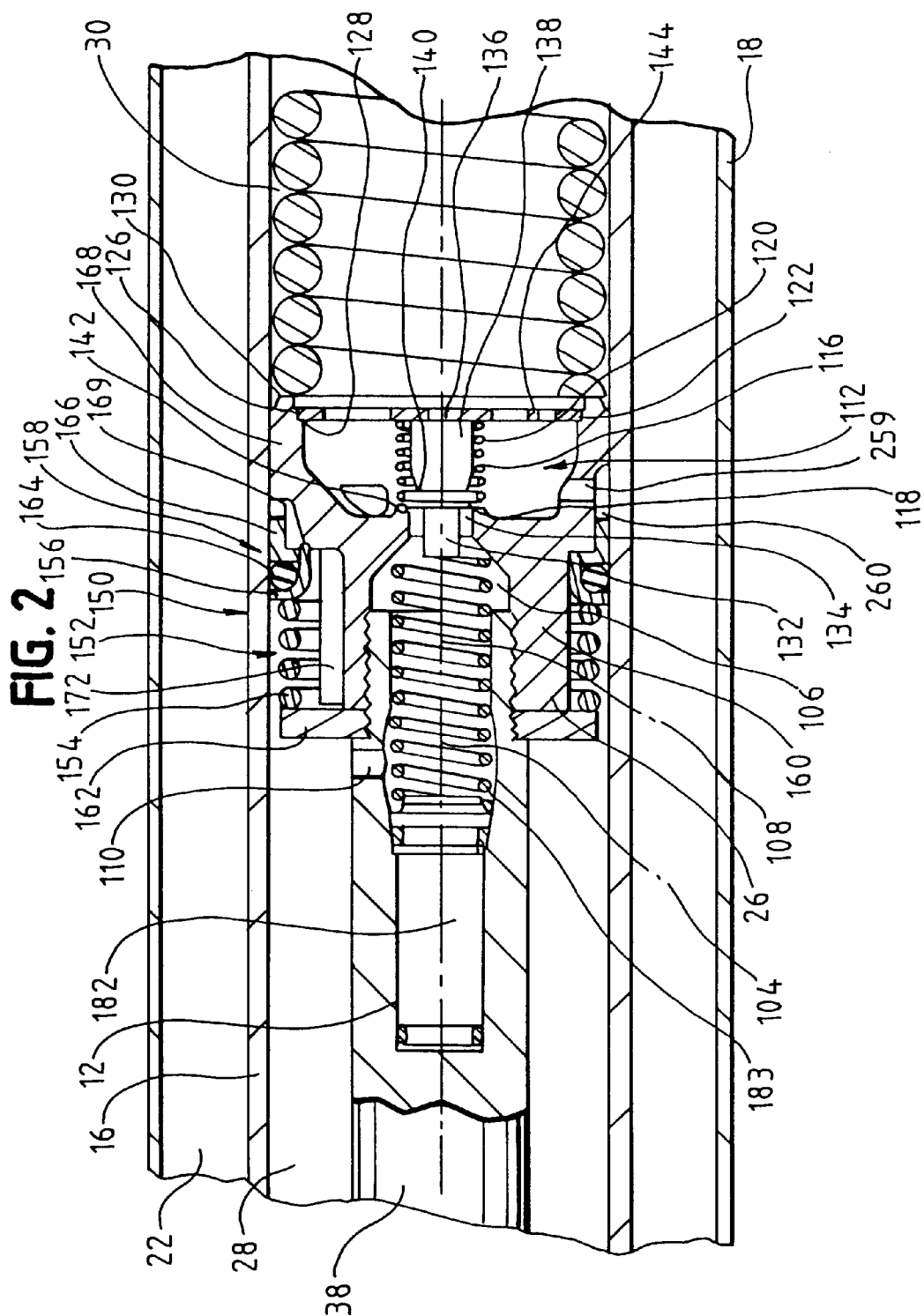
FIG. 2 is a cross-sectional view of a shock absorber with an acceleration sensitive damping mechanism according to a preferred embodiment of the present invention, showing the damping mechanism in its non-damping position.

As was mentioned above, the shock absorber 10 includes a flow control system for permitting controlled fluid flow between the rebound and compression compartments 28, 30 as the piston 26 moves within the internal chamber 20. The flow control system preferably includes a rebound by-pass means for permitting controlled by-pass fluid flow through the piston 26 from the rebound compartment 28 to the compression compartment 30 during the rebound stroke. As can be seen in FIG. 2, the rebound by-pass means includes at least one flow passage 104 extending through the piston 26 and piston rod 38 between the rebound and compression compartments 28, 30. In the illustrated embodiment the flow passage 104 includes a bore 106 extending along the central longitudinal axis of the piston 26. The flow passage 104 further includes a bore 108 extending along the longitudinal axis of the piston rod 38, concentrically with and opening at its inner end to longitudinal bore 106 in the piston 26. At least one transverse bore 110 extends through the piston rod 38 and intersects the piston rod longitudinal bore 108.

The rebound by-pass means also includes a rebound valve 118 and rebound valve spring 120 which allows fluid flow through the flow passage 104 from the rebound compartment 28 to the compression compartment 30 but prevents flow through the passage 104 from the compression compartment 30 to the rebound compartment 28. The check valve means 112 is secured in a counter bore 122 in the inner face of the piston 26 by a retention disk 126. The retention disk 126 fits in an increased diameter portion in the lower end of the counter bore 122 and is secured in place between an inner shoulder 128 and an outer flange 130. The outer flange 130 may be formed by rolling or swaging the lower end of the piston 26 inwardly.

The valve pin 116 includes a reduced diameter upper portion 132 which extends into a reciprocal reduced diameter bore 134 formed in the lower end of the flow passage 106. The valve disk 118 is slidably mounted about the upper portion 132 of the pin 116. The middle portion 138 of the pin 116 has an increased diameter and forms a shoulder 140. The spring 120 is mounted concentrically about the pin 116 and is compressed between the valve disk 118 and the retention disk 126. The spring normally biases the valve disk 118 into engagement with a valve seat 142 formed in the lower end of the flow passage 106 to restrict flow therethrough. The pin 116 also has a reduced diameter lower portion 136 which is fixed within a central aperture in the retention disk 126. Downward travel of the disk 118 is limited by abutting the shoulder 140 of the pin 116.

During the rebound stroke, increased pressure in the rebound compartment 28, and hence the flow passage 110, 104 and 106, act against the upper face of the disk 118 to bias it out of engagement with the valve seat 142. The fluid flows past the disk 118 and into the counter bore 122. The retention disk 126 includes a plurality of radially spaced apertures 144 which permit the fluid to flow from the counter bore 122 and into the expanding volume of the compression compartment 30.

The flow control system also includes a compression by-pass means 150 for providing controlled by-pass flow around the piston 26 from the compression compartment 30 to the rebound compartment 28 during the compression stroke. The compression by-pass means 150 comprises a one-way check valve 152 mounted on the outer periphery of the piston 26. The check valve 152 comprises a spring 154, a seal seat 156 and a seal assembly 158 concentrically secured on a reduced diameter portion 160 of the piston 26 by a retention ring 162. The retention ring 162 is compressed between the upper face of the piston 26 and the piston rod 38 to secure its relative position. In the illustrated embodiment, the piston rod 38 threads into a reciprocal threaded aperture in the piston 26. It should be appreciated, however, that other means may be employed for connecting the piston rod 38 to the piston 26, such as welding or shrink fitting.

The seal assembly 158 includes first and second seal members 164, 166. The seal seat 156 is positioned at the junction of the spring 154 and the first seal member 164 to prevent the spring from damaging the adjacent upper seal surface. The second seal member 166 has an outer diameter which forms a close, free sliding fit with the inner diameter of the inner cylinder 16. In turn, the second seal member 166 prevents rebound fluid pressures from extruding the first seal member 164 into the space between the piston skirt 168 and the inner surface of the inner cylinder 16. The outer diameter of the piston portion 160 has flutes 172 defining fluid passages which permit fluid to flow between the compression and rebound compartments 30, 28. The seal members 164, 166 are normally biased into engagement with the upper face 169 of the piston lower portion (as shown) by the spring 154. The seal members 164, 166 move to this position during the rebound stroke to block fluid flow through the fluted passages 172 between the lower piston portion 168 and the interior wall of the inner cylinder 16. During the compression stoke, increasing fluid pressure in the compression compartment is transmitted from piston counterbore 122 through a fluid passage 259 to the circumferential chamber 260 first seal member 164. The fluid pressure in turn acts against the lower surface of the second seal member 166 to bias it out of engagement with the piston lower portion 168 and permit fluid to flow through the fluted passages 172 and into the expanding volume of the rebound compartment 28.

Referring again to FIG. 1, the shock absorber flow control system includes a replenishing valve 178 and a compression valve 180 positioned in the base member 54. Both valves 178, 180 operate as spring biased check valves, and both communicate with the compression compartment 30 on their top side and with the reservoir compartment 22 on their lower side. During a compression stroke, increasing pressure in the compression compartment 30 biases the replenishing valve 178 closed and the compression valve 180 open, thereby allowing fluid to flow from the compression compartment 30 into the reservoir compartment 22. Conversely, during a rebound stroke, decreasing pressure in the compression compartment 30 biases the compression valve 180 closed and the replenishing valve 178 open, thereby allowing fluid to flow from the reservoir compartment 22 into the compression compartment 30 to replenish the volume vacated by the piston rod 38 as it extends or moves out of the internal chamber 20. Simultaneously, and referring to FIG. 2, increasing pressure in the rebound compartment 28 is transmitted through transverse bore 110, flow passage 104 and piston bore 106 to the rebound side of the rebound valve disk 118, which is forced off the valve seat 142 when the force of the fluid exceeds the force of valve spring 120, permitting fluid flow between the rebound compartment and the compression compartment.

It will be understood that the construction of the shock absorber as thus far described is similar to the shock absorbers described in the aforementioned patents. It will also be understood that the components thus far described may assume other configurations without departing from the scope of the present invention.

Apparatus according to a preferred embodiment of the present invention includes a mechanism 12 for controllably damping the movement of the piston rod 38 with respect to the internal chamber 20. As can be seen in FIG. 2, the mechanism 12 includes a plunger 182 for controllably blocking the transverse bore 110 and flow passage 104 to prevent fluid flow therethrough. Preventing fluid flow through the transverse bore 110 and fluid passage 104, in turn, inhibits the rebound movement of the piston 26 and piston rod 38, within the internal chamber 20.

To aid in the discussion of the preferred embodiments, the piston 26, piston rod 38 and other components of the shock absorber 10 fixedly attached thereto will be referred to as the "piston rod assembly." Likewise, the inner cylinder 16, outer cylinder 18, first closure assembly 34 and other components of the shock absorber 10 fixedly attached thereto will be referred to as the "shock main body."

The plunger 182 is slidably positioned relative to the transverse bore 110 and flow passage 104 for movement between a non-interfering position and an interfering position. When the plunger 182 is in the non-interfering position, as illustrated in FIG. 2, it is retracted beyond the transverse bores 110 to permit fluid to flow through the transverse bores 110 and through the flow passage 104. When the plunger 182 is moved to the interfering position, it extends into the flow passage 104 beyond the transverse bores 110 to block fluid flow therethrough. The plunger 182 is normally biased toward the non interfering position by a biasing member 183 which may be a simple spring.

In order for the plunger 182 to move from the non-interfering position to the interfering position, there must be a relative motion between the plunger 182 and the transverse bore 110 for a sufficient period of time. The transverse bore 110 is located on the piston rod 38 so will experience the same motion as the piston rod 38. The plunger 182, as illustrated in FIG. 2, is connected to the piston 26 with a spring 183. Thus, while the longitudinal motion of the piston rod assembly affects the longitudinal motion of the plunger by force transmission through the spring 183, there will typically be differential acceleration and relative motion between the plunger 182 and the transverse bore 110.

If the differential motion between the plunger 182 and the transverse bore 110 integrated over time results in a large enough relative displacement between the plunger 182 and the transverse bore 110 to move the plunger 182 into the interfering position, fluid flow through the transverse bore 110 and fluid passage 104 will be inhibited. The inhibited fluid flow through the transverse bore 110 and fluid passage 104 will, in turn, reduce or eliminate the relative motion between the piston 26 and the internal chamber 20, and thus reduce or eliminate the relative motion between the piston rod assembly and the shock main body. In order for the plunger 182 to move back into the non-interfering position, there must then be a negative relative motion between the plunger 182 and the transverse bore 110, which when integrated over time results in a large enough negative relative displacement between the plunger 182 and the transverse bore 110 to restore the plunger 182 to the non-interfering position. Once the plunger 182 is restored to the non interfering position, fluid is allowed to flow through the transverse bore 110 and fluid passage 104, and the relative motion between the piston 26 and internal chamber 20 is enabled.

Note that the relative motion between the plunger 182 and the transverse bore 110 resulting in the plunger 182 moving into the interfering position is caused, at least in part, by differential accelerational forces originating from sources external to the shock absorber 10 acting on the damping mechanism components 12. Rather than actively moving the plunger 182 into the interfering position with an active displacement means, such as a solenoid, the shock absorber 10 is designed to assume a more passive role, allowing forces originating from outside the confines of the shock absorber 10 to induce passive relative accelerations between the plunger 182 and the transverse bore 110, which over time result in a passive differential displacement between the plunger 182 and the transverse bore 110.

Figure 3:
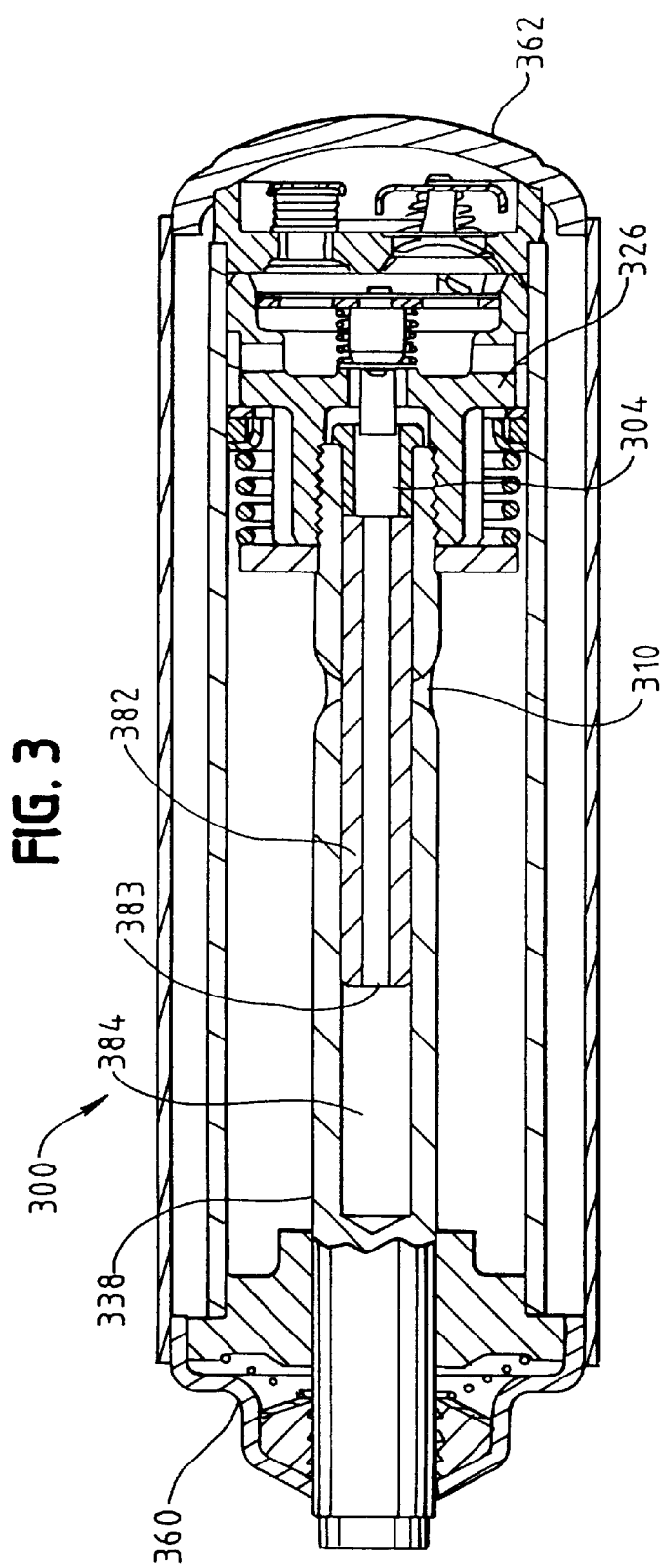
FIG. 3 is a cross-sectional view of a shock absorber with acceleration sensitive damping according to a second embodiment of the present invention.

A variation of the preferred embodiment is illustrated in FIG. 3, which illustrates a shock absorber 300 incorporating an alternative embodiment of the present invention. Note that Instead of a biasing member, gravitational force is used to bias the plunger 382 toward the non-interfering position. The shock absorber 300 is positioned with the rod end 360 positioned gravitationally downward from the closed end 362. The plunger 382 is normally biased by gravity into the non-interfering position in the rod end of the extended flow channel 384. When the piston rod 338, and thus the transverse bores 310, is subjected to a greater longitudinally downward acceleration than the acceleration of the plunger 382 caused by gravity, the plunger will move relatively toward the transverse bores 310 and toward the interfering position. The plunger 382 is illustrated in FIG. 3 in the interfering position, in which the plunger 382 inhibits the flow of fluid through the transverse bores 310 and flow passage 304, thereby damping the rebound motion of the piston 326 and piston rod 338. Note that the plunger 382 contains a longitudinal through-hole 383, the size of which, along with the viscosity of the fluid in the extended flow channel 384, is a Tactor in determining the accelerational force characteristics necessary to move the plunger 382 into and out of the interfering position.

Figure 4:
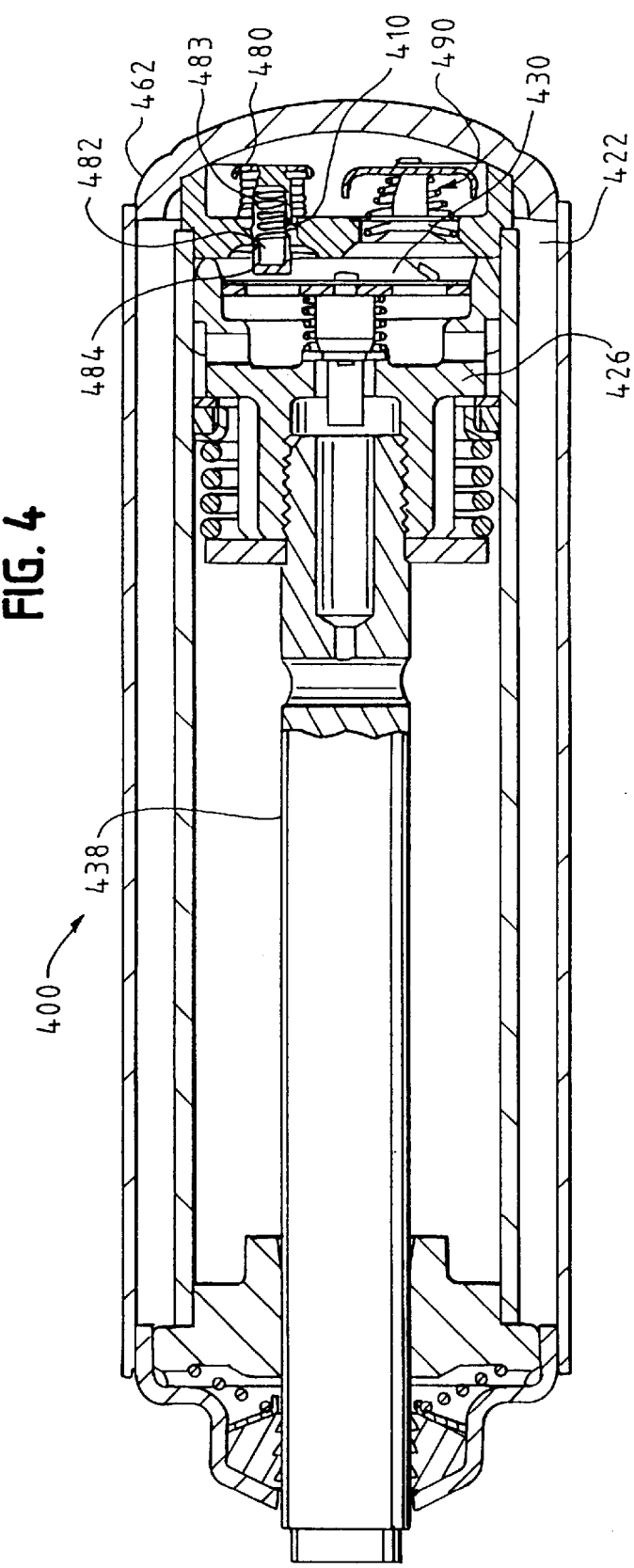
FIG. 4 is a cross-sectional view of a shock absorber with acceleration sensitive damping according to a third embodiment of the present invention.

A third embodiment of the present invention is illustrated in FIG. 4. FIG. 4 illustrates a shock absorber 400 incorporating an acceleration sensitive damping mechanism 401 into the compression valve assembly 480. The plunger 482 is housed in a plunger retainer 484 and positioned near the radial oil flow hole 410. The plunger 482 is normally biased toward the non-interfering position by a spring 483. As opposed to the embodiment illustrated in FIGS. 1–3, the embodiment illustrated in FIG. 4 incorporates acceleration sensitive damping into the fluid flow path controlling the compression motion of the shock absorber 400. During a compression cycle, the relatively inward motion of the piston rod 426 and piston 438 normally force fluid to flow from the compression compartment 430 to the reservoir compartment 422 through the compression valve assembly 480. However, when the closed end 462 of the shock 400 (and thus the flow hole 410) and the plunger 482 experience a differential acceleration of sufficient magnitude and duration to result in the movement of the plunger 482 into the interfering position, the fluid flow through the flow hole 410 is inhibited. Thus, the flow of fluid from the compression compartment 430 to the reservoir compartment 422 will be inhibited, thereby increasing compression damping for eht relative motion between the piston rod assembly and the shock main body.

In a manner similar to the embodiment illustrated in FIG. 4, a flow hole and plunger assembly may be designed into the replenishing valve assembly 490. The replenishing valve assembly 490 governs the flow of fluid from the reservoir compartment 422 to the compression compartment 430 during the rebound motion of the shock absorber 400. Thus incorporating acceleration sensitive fluid flow control to the replenishing valve assembly 490 effectively provides acceleration sensitive damping for the rebound motion of the shock absorber 400.

Figure 5:
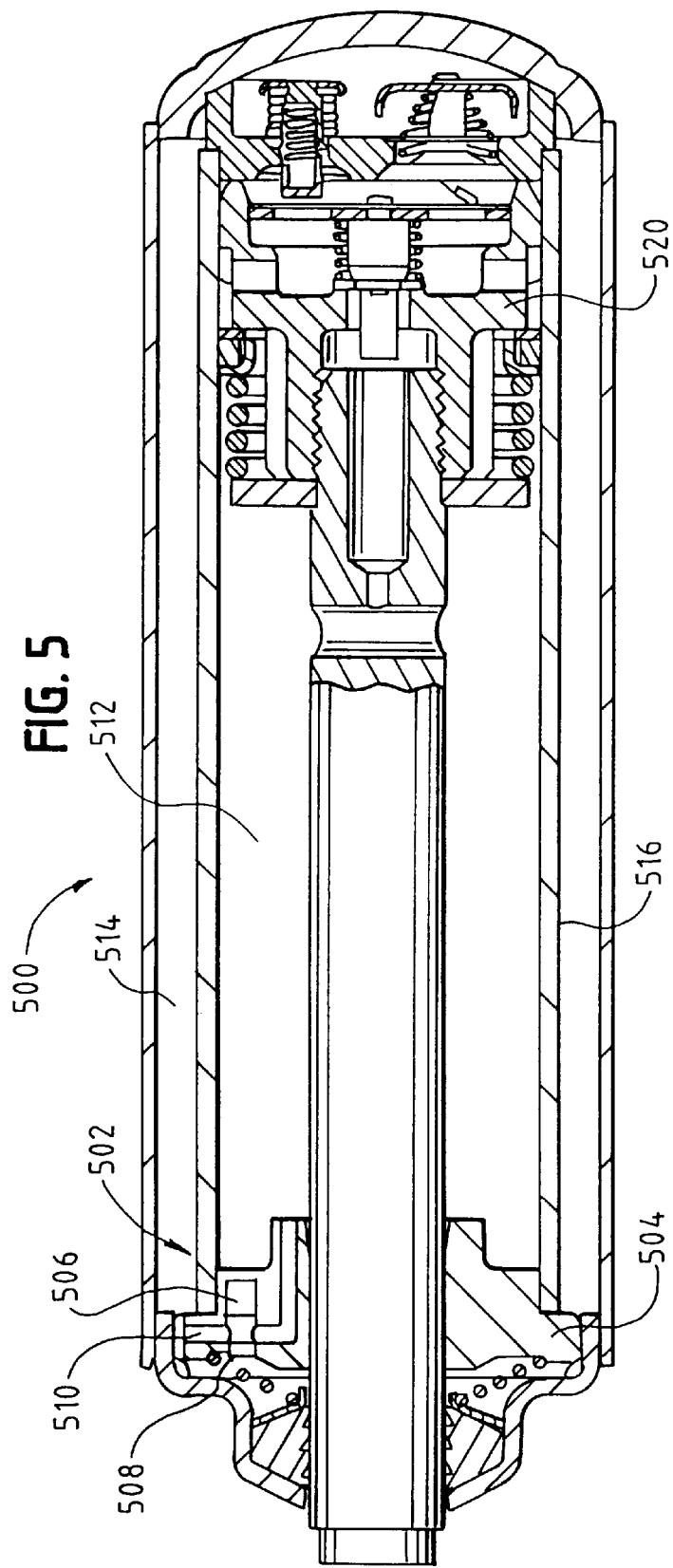
FIG. 5 is a cross-sectional view of a shock absorber with acceleration sensitive damping according to a fourth embodiment of the present invention.

FIG. 5 illustrates a fourth embodiment of the present invention. A shock absorber 500 is illustrated which incorporates an acceleration sensitive damping mechanism 502 into the inner cylinder head 504. A radial oil flow hole 510 extends between the rebound compartment 512 and the reservoir compartment 514. A plunger 506 is housed in a plunger retainer 508 and positioned near the radial oil flow hole 510. The plunger 506 is normally biased toward the non-interfering position which allows fluid to flow between the rebound compartment 512 and the reservoir compartment 514 through the flow hole 510. Under designed differential acceleration conditions between the plunger 506 and the flow hole 510, the plunger 506 moves into the interfering position inhibiting fluid flow between the rebound compartment 512 and the reservoir compartment 514, thereby damping the relative motion between the piston 520 and the internal chamber 516.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An improved shock absorber for a vehicle where the shock absorber has a movable piston assembly and is capable of adjusting the damping of the shock absorber in response to inordinately rapid accelerations of the piston assembly such as, for example, when the vehicle is jarred by hitting a pot hole, the improved shock absorber comprising:

a reservoir compartment;

a hollow cylinder defining an internal chamber having ends;

the piston assembly including a piston that is slidably mounted within the internal chamber for movement in the cylinder in a rebound stroke direction or in a compression stroke direction, with the piston separating the internal chamber into a compression compartment and a rebound compartment, the volumes of which compartments vary in accordance with the position of the piston in the internal chamber;

a first end closure closing the end of the internal chamber adjacent the compression compartment;

the piston assembly also including a piston rod that is connected to the piston, that has a central longitudinal axis, and that extends from the end of the internal chamber adjacent the rebound compartment;

a second end closure closing the end of the internal chamber adjacent the rebound compartment and slidably sealingly engaging about the piston rod;

a fluid filling the internal chamber and at least partially filling the reservoir compartment;

a first fluid flow passage extending between the compression compartment and the rebound compartment;

a first flow control valve that permits flow of fluid through the first fluid flow passage when the piston moves in the compression stroke direction and that prevents flow of fluid through the first fluid flow passage when the piston moves in the rebound stroke direction;

a second fluid flow passage extending between the rebound compartment and the compression compartment;

a second fluid flow control valve that permits flow of fluid through the second fluid flow passage when the piston moves in the rebound stroke direction and that prevents flow of fluid through the second fluid flow passage when the piston moves in the compression stroke direction; and a member that has a predetermined mass, that is movable with the piston assembly, and that is also movable relative to the piston assembly in a direction parallel with the central longitudinal axis between: (a) a first position where the member interferes with flow of fluid through the second fluid flow passage, and (b) a second position where there is no interference by the member with flow of fluid through the second fluid flow passage, with the member being normally biased by a spring to the second position, and with the member being movable to the first position from the second position when the inertia of the member, resulting from the rapid acceleration of the piston assembly in the rebound stroke direction, overcomes the bias of the spring.

2. The improved shock absorber of claim 1 wherein the second fluid flow passage is the sole passage for permitting flow of fluid from the rebound chamber to the compression chamber when the piston moves in the rebound stroke direction.

3. The improved shock absorber of claim 2 wherein a portion of the second flow passage is in the piston assembly and is aligned with the central longitudinal axis; and wherein the member is moved within the portion of the second fluid flow passage when the member is moved to the first position.

4. The improved shock absorber of claim 2 wherein the member is disposed within a bore in the piston rod; and wherein the bore is aligned with the central longitudinal axis.

5. The improved shock absorber of claim 4 wherein the spring is a coil compression spring having an axis aligned with the central longitudinal axis.

6. The improved shock absorber of claim 4 wherein the spring is disposed between the member and the piston.

7. The improved shock absorber of claim 4 wherein a portion of the second fluid flow passage is in the piston assembly and is aligned with the central longitudinal axis; and wherein the member is moved within the portion of the second fluid flow passage when the member is moved to the first position.

8. The improved shock absorber of claim 7 wherein the spring is a coil compression spring having an axis aligned with the central longitudinal axis.

9. The improved shock absorber of claim 8 wherein spring is disposed between the member and the piston.

* * * * *